United States Patent

Ramesh

(10) Patent No.: US 6,492,013 B1
(45) Date of Patent: Dec. 10, 2002

(54) FOAM COMPOSITE STRUCTURE COMPRISING A BLEND OF POLYPROPYLENE AND HOMOGENEOUS ETHYLENE/ALPHA-OLEFIN COPOLYMER

(75) Inventor: N. S. Ramesh, Grapevine, TX (US)

(73) Assignee: Sealed Air Corporation, Saddle Brook, NJ (US)

( * ) Notice: Subject to any disclaimer, the term of this patent is extended or adjusted under 35 U.S.C. 154(b) by 0 days.

(21) Appl. No.: 09/819,312

(22) Filed: Mar. 28, 2001

(51) Int. Cl.$^7$ ................................................ B32B 5/14
(52) U.S. Cl. ............................ 428/308.4; 428/304.4; 428/306.6; 428/316.6
(58) Field of Search ................ 428/304.4, 306.6, 428/308.4, 316.6

(56) References Cited

U.S. PATENT DOCUMENTS

| | | | |
|---|---|---|---|
| 3,616,020 A | 10/1971 | Whelan et al. | 156/244 |
| 3,666,834 A | 5/1972 | Bullard | 260/897 A |
| 3,893,957 A | 7/1975 | Mixon et al. | 260/2.5 |
| 4,244,900 A | 1/1981 | Heider | 264/46.1 |
| 4,339,551 A | 7/1982 | Heider | 521/138 |
| 4,368,604 A | 1/1983 | Spielau et al. | 52/309.8 |
| 4,421,867 A | 12/1983 | Nojiri et al. | 521/82 |
| 4,567,219 A | 1/1986 | Tominaga et al. | 524/413 |
| 4,626,455 A | 12/1986 | Karabedian | 428/35 |
| 4,649,001 A | 3/1987 | Nakamura et al. | 264/50 |
| 4,661,401 A | 4/1987 | Akao | 428/215 |
| 4,738,810 A | 4/1988 | Cheng-Shiang | 264/54 |
| 4,785,045 A | 11/1988 | Yonekura et al. | 524/528 |
| 4,900,490 A | 2/1990 | Kozma | 264/54 |
| 4,911,978 A | 3/1990 | Tsubone et al. | 428/317.9 |
| 4,929,303 A | 5/1990 | Sheth | 156/209 |
| 4,975,313 A | 12/1990 | Ezawa et al. | 428/213 |
| 5,000,992 A | 3/1991 | Kelch | 428/36.5 |
| 5,032,463 A | 7/1991 | Smith | 428/520 |
| 5,053,438 A | 10/1991 | Kozma | 521/134 |
| 5,167,765 A | 12/1992 | Nielsen et al. | 162/146 |
| 5,180,628 A | 1/1993 | Haardt et al. | 428/215 |
| 5,242,750 A | 9/1993 | Wagner et al. | 428/316.6 |
| 5,290,822 A | 3/1994 | Rogers et al. | 521/94 |
| 5,292,815 A | 3/1994 | Wreesmann et al. | 525/259 |
| 5,320,887 A | 6/1994 | Moss et al. | 428/35.7 |
| 5,322,724 A | 6/1994 | Levens | 428/57 |
| 5,346,926 A | 9/1994 | Skamoto et al. | 521/81 |
| 5,393,796 A | 2/1995 | Halberstadt et al. | 521/134 |
| 5,428,093 A | 6/1995 | Lee | 524/317 |
| 5,462,974 A | 10/1995 | Lee | 521/79 |
| 5,473,015 A | 12/1995 | DeNicola, Jr. et al. | 525/71 |
| 5,502,158 A | 3/1996 | Sinclair et al. | 528/354 |
| 5,516,582 A | 5/1996 | Hikasa et al. | 428/319.9 |
| 5,609,703 A | 3/1997 | Hamada et al. | 156/79 |
| 5,667,728 A | 9/1997 | Lee | 252/350 |
| 5,691,047 A | 11/1997 | Kurauchi et al. | 428/315.7 |
| 5,783,611 A | 7/1998 | Strebel | 521/51 |
| 5,882,776 A | 3/1999 | Bambara et al. | 428/215 |
| 5,902,674 A | 5/1999 | Makino et al. | 428/318.6 |
| 5,928,776 A | 7/1999 | Shioya et al. | 428/316.6 |
| 5,938,878 A | 8/1999 | Hurley et al. | 156/219 |
| 6,096,793 A | 8/2000 | Lee et al. | 521/134 |
| 6,358,599 B1 * | 3/2002 | Deibel et al. | 428/220 |

FOREIGN PATENT DOCUMENTS

| | | |
|---|---|---|
| JP | 1217049 | 8/1989 |
| JP | 1252645 | 10/1989 |
| JP | 8156153 | 6/1996 |
| JP | 9156053 | 6/1997 |

\* cited by examiner

*Primary Examiner*—James J. Seidleck
*Assistant Examiner*—Travis B Ribar
(74) *Attorney, Agent, or Firm*—Thomas C. Lagaly

(57) ABSTRACT

A foam sheet including a blend of polypropylene and homogeneous ethylene/alpha-olefin copolymer, wherein the polypropylene is present in the blend at a weight percentage ranging from 70 to 95 and the homogeneous ethylene/alpha-olefin copolymer is present in the blend at a weight percentage ranging from 5 to 30. Foam composite structures in which the aforedescribed foam sheet is bonded to polyethylene and/or polypropylene foam sheets are also disclosed.

15 Claims, 1 Drawing Sheet

FOAM COMPOSITE STRUCTURE COMPRISING A BLEND OF POLYPROPYLENE AND HOMOGENEOUS ETHYLENE/ALPHA-OLEFIN COPOLYMER

BACKGROUND OF THE INVENTION

The present invention relates generally to polyolefin foams and, more particularly, to extruded polyethylene or polypropylene foam sheets bonded to a foam sheet comprising a blend of polypropylene and homogeneous ethylene/alpha-olefin copolymer.

Polyolefin foams, particularly polyethylene foams, and methods for manufacturing such foams are well known in the art. See, e.g., U.S. Pat. No. 5,348,984 (Lee), U.S. Pat. No. 5,462,974 (Lee), and U.S. Pat. No. 5,667,728 (Lee), the disclosures of which are incorporated herein by reference thereto. One of the most common polyethylenes used is low density polyethylene (LDPE).

While polyethylene (PE) possesses a number of beneficial physical and chemical properties when used to produce a foamed sheet, a disadvantage of PE is that extruded foam sheets made therefrom have a flexural modulus that is lower than would otherwise be desired for certain applications. For example, PE foams are commonly used to manufacture a type of flotation article known as a "bodyboard," which is a generally planar foamed structure of various shapes and sizes that allows individuals to be carried forward by oceanic waves as the waves break near the shore, i.e., to ride or "surf" the waves. This is commonly accomplished by grasping the edges of the bodyboard with a portion of the upper body positioned above, and often in contact with, the upper surface of the board. Individuals engaging in such activity generally prefer that the bodyboard be as stiff as possible as this allows the individual to maneuver the board to control somewhat the individual's direction of travel relative to the wave surface upon which the individual is "surfing." Too much flexure in the bodyboard detracts from this ability to maneuver the board along the wave surface. Accordingly, efforts have been made to increase the stiffness of the foam used to make bodyboards.

One possible solution would be to construct the bodyboard from polypropylene (PP) foam, which is typically stiffer than PE foam. However, PP foam has generally been found to be overly stiff and brittle, resulting in a bodyboard that is too easily damaged (e.g., gouged) and difficult to firmly grasp and handle, particularly when wet. In addition, PP foam has a surface texture that is uncomfortable against the skin, especially when rubbed against the skin as generally occurs during bodyboarding.

Another possibility is to form a composite structure that includes a PE foam sheet bonded to a PP foam sheet. The PE foam sheet would provide comfort, grippability, and durability, while the PP foam sheet would provide increased stiffness and performance. Unfortunately, PP and PE foams are not chemically compatible and will not readily adhere to one another. Delamination is therefore a significant problem for PE foam/PP foam laminates.

It may be possible, in certain cases, to use special chemical adhesives (i.e., glues) to bond PP and PE foams. However, such adhesives are expensive and the process of coating and bonding is both tedious and expensive. The process involves slow production steps and the adhesives contain volatile organic solvents that are undesirable for release into the air. Extra equipment, therefore, is generally needed to recover the solvents, thus further adding to the expense and complexity of the adhesive coating process.

Accordingly, a need exists in the art for an economical and practical means for improving the stiffness of PE foam, e.g., by bonding PP foam or PP-containing foam to PE foam with sufficient strength that the resultant composite structure is suitable for commercial use, such as for bodyboards or other watersport applications. Such composite structures would also be beneficial in other end-use applications, such as packaging, by providing enhanced cushioning and shock-absorption to packaged articles, e.g., computers, during shipment. A need also exists in the art for a means for improving the brittleness of PP foam.

SUMMARY OF THE INVENTION

That need is met by the present invention, which, in one aspect, provides a foam sheet comprising a blend of polypropylene and homogeneous ethylene/alpha-olefin copolymer, wherein the polypropylene is present in the blend at a weight percentage ranging from 70 to 95 and the homogeneous ethylene/alpha-olefin copolymer is present in the blend at a weight percentage ranging from 5 to 30. The inventor has discovered that homogeneous ethylene/alpha-olefin copolymer blends well with polypropylene such that a high quality foam can be made from such blend. As compared to a foam made from polypropylene alone, a foam made from a blend of PP and homogeneous ethylene/alpha-olefin copolymer is less brittle while still retaining a high degree of stiffness. In addition, PP-homogeneous ethylene/alpha-olefin copolymer blend foam in accordance with the present invention has surprisingly been found to provide excellent adhesion to both PE foam and to PP foam without the need for adhesives.

Accordingly, another aspect of the present invention is a foam composite structure, comprising:

a. a first foam sheet comprising polyethylene; and b. a second foam sheet comprising a blend of polypropylene and homogeneous ethylene/alpha-olefin copolymer, wherein the first and second foam sheets are bonded together at a bond strength of at least about 2 $lb_f$/inch.

A further aspect of the invention pertains to a foam composite structure, comprising:

a. a first foam sheet comprising polypropylene; and b. a second foam sheet comprising a blend of polypropylene and homogeneous ethylene/alpha-olefin copolymer, wherein the first and second foam sheets are bonded together at a bond strength of at least about 2 $lb_f$/inch.

DETAILED DESCRIPTION OF THE INVENTION

Figure 1:
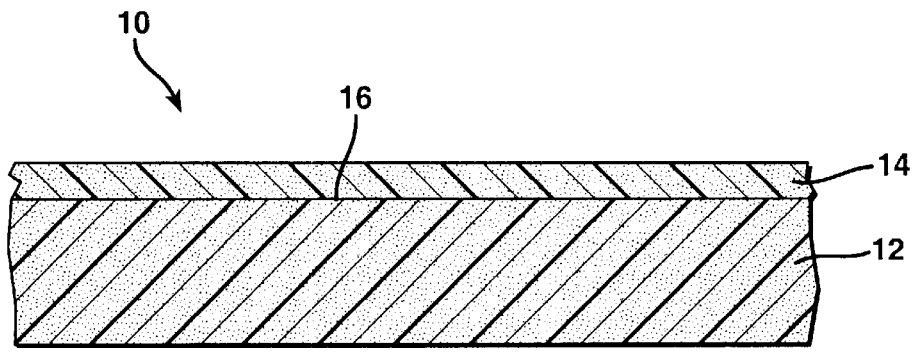
FIG. 1 is an elevational, cross-sectional view of a foam composite structure in accordance with the present invention.

FIG. 1 illustrates a foam composite structure 10 in accordance with the present invention, including a first foam sheet 12 comprising polyethylene and a second foam sheet 14 comprising a blend of polypropylene and homogeneous ethylene/alpha-olefin copolymer.

The first foam sheet 12 may comprise a polyethylene homopolymer or copolymer. Examples of useful polyethylene homopolymers include low density polyethylene and high density polyethylene. Polyethylene copolymers may include, e.g., homogeneous ethylene/alpha-olefin copolymers (i.e., metallocene/single-site catalyzed copolymers of ethylene and, e.g., one or more $C_3$ to $C_{10}$ alpha-olefin comonomers) or heterogeneous (i.e., Ziegler-Natta catalyzed) ethylene/alpha-olefin copolymers. A preferred polyethylene is low density polyethylene (LDPE) having a melt flow index ranging from about 1 to about 40 and a density ranging from about 0.915 to about 0.930 g/cc.

Foam sheet 12 may have any desired thickness to suit the intended end-use application, preferably ranging, e.g., from about 1/16 inch to about 5 inches. The foam may have any desired density, ranging, e.g., from about 0.5 to about 30 pounds/ft$^3$. The density preferably ranges from about 1 to about 10 pounds/ft$^3$ and, most preferably, from about 1.5 to about 8 pounds/ft$^3$. The foam sheet preferably has at least about 70% closed cells, more preferably about 80% closed cells and, most preferably, at least about 90% closed cells.

Various additives or other materials may be included with polyethylene in first foam sheet 12. However, such additives or other materials, if present, preferably account for less than 40 percent by weight of the foam sheet, more preferably less than 30 percent, more preferably still less than 20 percent, and most preferably less than 10 percent by weight of the foam sheet. Thus, first foam sheet 12 preferably consists essentially of polyethylene.

In second foam sheet 14, polypropylene is preferably present in the blend at a weight percentage ranging from about 70 to about 95 while homogeneous ethylene/alpha-olefin copolymer is present in the blend at a weight percentage ranging from about 5 to about 30 (such weight percentages being based on the total weight of the blend in second foam sheet 14). Within such ranges, all sub-ranges are also included, such as 75–90 wt. % for PP and 10–25 wt. % for homogeneous ethylene/alpha-olefin copolymer; 80–90 wt. % PP and 10–20 wt. % homogeneous ethylene/alpha-olefin copolymer; etc.

Suitable polypropylenes for use in second foam sheet 14 and in other foam sheets as discussed below, including atactic, isotactic, syndiotactic, and long-chain branched PP homopolymers and copolymers, such as propylene/ethylene copolymer. Preferred are polypropylene homopolymers having a melt flow index ranging from about 1 to 20 and a density ranging from about 0.87 to 0.915 g/cc. Further, a high melt strength/long-chain branched polypropylene is preferred. Such polypropylenes exhibit higher extensional viscosity when compared to other polypropylenes, resulting in beneficial strain hardening when the cells are expanded during the foaming process.

With respect to the homogeneous ethylene/alpha-olefin copolymer used in second foam sheet 14, and in other foam sheets as discussed below, as is well understood in the art, a "homogeneous" ethylene/alphaolefin copolymer refers to ethylene/alpha-olefin copolymerization reaction products of relatively narrow molecular weight distribution and relatively narrow composition distribution. Homogeneous ethylene/alpha-olefin copolymers are structurally different from heterogeneous ethylene/alpha-olefin copolymers, in that homogeneous ethylene/alpha-olefins exhibit a relatively even sequencing of comonomers within a chain, a mirroring of sequence distribution in all chains, and a similarity of length of all chains, i.e., a narrower molecular weight distribution. Furthermore, homogeneous ethylene/alpha-olefin copolymers are typically prepared using metallocene, or other single-site type catalysts, rather than using Ziegler Natta catalysts. Such single-site catalysts typically have only one type of catalytic site, which is believed to be the basis for the homogeneity of the polymers resulting from the polymerization. A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of 1-butene, 1-pentene, 1-hexene, and 1-octene.

Preferred homogeneous ethylene/alpha-olefins have a density of less than about 0.94 g/cc, more preferably less than 0.92 g/cc, and most preferably less than about 0.91 g/cc, and a melt index ranging from about 2 to about 40.

Foam sheet 14 may have any desired thickness to suit the intended end-use application, preferably ranging, e.g., from about 0.05 inch to about 2.25 inches. The foam may have any desired density, ranging, e.g., from about 0.5 to about 12 pounds/ft$^3$. The density preferably ranges from about 1 to about 5 pounds/ft$^3$ and, most preferably, from about 1.5 to about 4 pounds/ft$^3$. The foam sheet preferably has at least about 70% closed cells, more preferably about 80% closed cells and, most preferably, at least about 90% closed cells.

Advantageously, it has been discovered that a foam comprising a blend of polypropylene and homogeneous ethylene/alpha-olefin copolymer in accordance with the present invention exhibits excellent adhesion with a foam sheet comprising polyethylene without the necessity of using adhesives or other special coatings. Rather, as demonstrated in the Examples, the simple application of heat and pressure to both foams produces a strong bond. As a result, the first and second foam sheets 12 and 14 are bonded together at interface 16 at a bond strength greater than 2 lb$_f$/inch, more preferably greater than 3 lb$_f$/inch and, most preferably greater than 3.5 lb$_f$/inch.

Accordingly, foam composite structures in accordance with the present invention are suitable for commercial applications. For example, the foam composite structure 10 shown in FIG. 1 may find beneficial use as packaging cushions for, e.g., computers, with the PP/homogeneous ethylene/alpha-olefin copolymer blend of second foam sheet 14 providing additional toughness and compressive strength to the cushioning and shock absorption properties of the polyethylene foam in first foam sheet 12.

Figure 2:
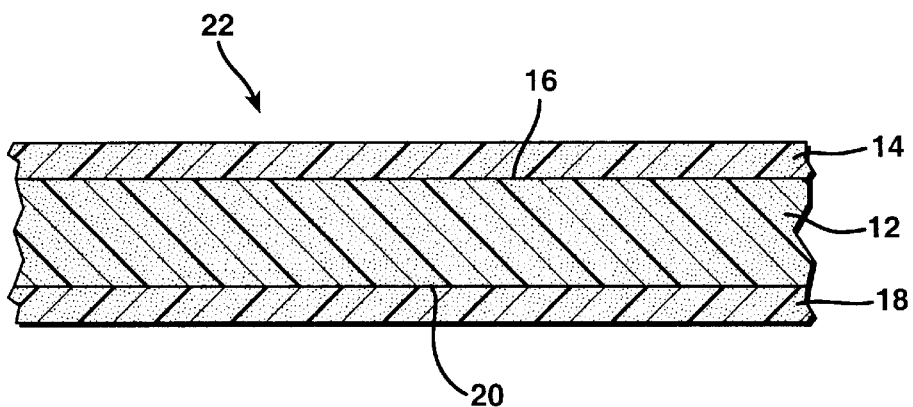
FIG. 2 is an elevational, cross-sectional view of an alternative foam composite structure in accordance with the present invention.

If desired, e.g., for further increases in toughness and compressive strength, a third foam sheet 18 may be bonded to first foam sheet 12 at interface 20 as shown in FIG. 2. Like second foam sheet 14, third foam sheet 18 comprises a blend of polypropylene and homogeneous ethylene/alpha-olefin copolymer, and thereby bonds to first foam sheet 12 at a bond strength of greater than 2 lb$_f$/inch. In this embodiment, designated as foam composite structure 22 in FIG. 2, the PE-based first foam sheet 12 is positioned between the second and third foam sheets 14 and 18, each of which may serve as relatively tough outer 'skins' on the relatively more resilient 'core' of PE-based first foam sheet 12. First foam sheet 12 may have a thickness ranging from about 0.05 to about 2.25 inches while the second and third foam sheets 14, 18 may each have thicknesses ranging from about 0.005 to about 0.25 inch.

Figure 3:
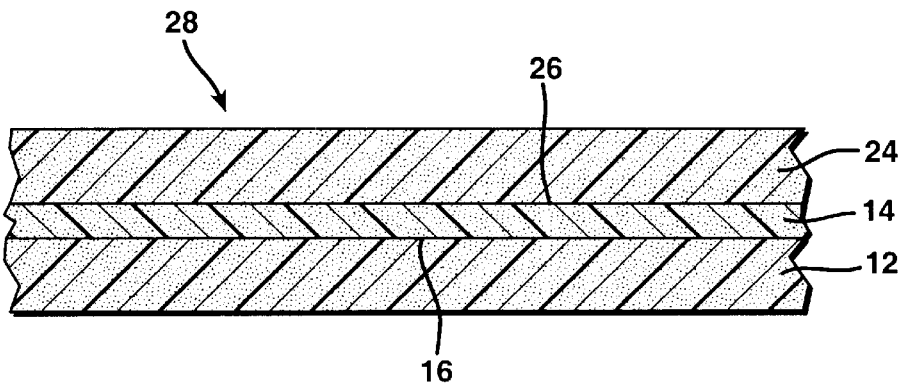
FIG. 3 is an elevational, cross-sectional view of a further alternative foam composite structure in accordance with the present invention.

A further alternative embodiment of the invention is shown in FIG. 3, in which a third foam sheet 24 comprising polypropylene is bonded to second foam sheet 14 at interface 26. In the resultant foam composite structure 28, second foam sheet 14 is positioned between the first and third foam sheets 12 and 24. Further, the foam sheet 24 is bonded to the second foam sheet 14 at a bond strength of at least 2 lb$_f$/inch. That is, the blended foam (PP and homogeneous ethylene/ alpha-olefin copolymer) in accordance with the present invention has also been found to bond strongly with polypropylene foam when subjected to heat and pressure.

Foam composite structure 28 may advantageously be used to form a bodyboard, with the PE foam sheet 12 providing comfort, grippability, and durability and the PP foam sheet 24 providing stiffness for good maneuverability while surfing. In use as a bodyboard, first foam sheet 12 would face upwards and be in contact with the surfer while third foam sheet 24 would face downwards and be in contact with the water. Various additives or other materials may be included with the polypropylene in third foam sheet 24. However, such additives or other materials, if present, preferably account for less than 40 percent by weight of the foam sheet, more preferably less than 30 percent, more preferably still less than 20 percent, and most preferably less than 10 percent by weight of the foam sheet. Thus, third foam sheet 24 preferably consists essentially of polypropylene. Second foam sheet 14 may have a thickness ranging from about 0.005 to about 0.25 inches while the first and third foam sheets 12 and 24 may each have thicknesses ranging from about 0.05 to about 2.25 inches.

As a further alternative embodiment of the present invention, first foam sheet 12 of foam composite structures 10 and 22 may comprise polypropylene, and preferably consists essentially of polypropylene, instead of polyethylene as described above. In all other respects, foam composite structures 10 and 22 are the same as described above and illustrated in FIGS. 1 and 2, with the PP first foam sheet 12 being bonded to second and third foam sheets 14 and 18, each of which comprise a blend of PP and homogeneous ethylene/alpha-olefin copolymer, at a bond strength of 2 lb$_f$/inch or greater, and preferably greater than 3 lb$_f$/inch. In this embodiment, the first foam sheet 12 preferably comprises polypropylene homopolymer having a density ranging from about 0.5 to about 15 pounds/ft$^3$ and a thickness ranging from about 1/16 inch to about 5 inches. Such composite structures may advantageously serve as structural foams, e.g., as internal structural supports for boats and other watercraft, with the blend foam of foam sheets 14, 18 providing flexibility and resiliency to the stiff but brittle PP foam in first foam sheet 12.

When first foam sheet 12 comprises polypropylene, third foam sheet 24 in foam composite structure 28 (FIG. 3) preferably comprises polyethylene, and preferably consists essentially of polyethylene. As noted above, such a composite structure is ideally suited for use as a bodyboard.

In producing the foam sheets described herein, any conventional chemical or physical blowing agents may be used. Preferably, the blowing agent is a physical blowing agent such as carbon dioxide, ethane, propane, n-butane, isobutane, pentane, hexane, butadiene, acetone, methylene chloride, any of the chlorofluorocarbons, hydrochlorofluorocarbons, or hydrofluorocarbons, as well as mixtures of the foregoing.

The blowing agent may be mixed with the polymer resin (i.e., polyethylene, polypropylene, or blend of polypropylene and homogeneous ethylene/alpha-olefin copolymer) in any desired amount to achieve a desired degree of expansion in the resultant foam. Generally, the blowing agent may be added to the polymer resin in an amount ranging from about 0.5 to 80 parts by weight, based on 100 parts by weight of the polymer. More preferably, the blowing agent is present at an amount ranging from 1 to 30 and, most preferably, from 3 to 15 parts per 100 parts by weight of the polymer.

If desired or necessary, various additives may also be included with the polymer. For example, it may be desirable to include a nucleating agent (e.g., zinc oxide, zirconium oxide, silica, talc, etc.) and/or an aging modifier (e.g., a fatty acid ester, a fatty acid amide, a hydroxyl amide, etc.). Other additives that may be included if desired are pigments, colorants, fillers, antioxidants, flame retardants, stabilizers, fragrances, odor masking agents, and the like.

Foam in accordance with the present invention is preferably made by an extrusion process that is well known in the art. In such a process, the polymer is added to an extruder, preferably in the form of resin pellets. Any conventional type of extruder may be used, e.g., single screw, double screw, and/or tandem extruders. In the extruder, the resin pellets are melted and mixed. A blowing agent is preferably added to the melted polymer via one or more injection ports in the extruder. Any additives that are used may be added to the melted polymer in the extruder and/or may be added with the resin pellets. The extruder pushes the entire melt mixture (melted polymer, blowing agent, and any additives) through a die at the end of the extruder and into a region of reduced temperature and pressure (relative to the temperature and pressure within the extruder). Typically, the region of reduced temperature and pressure is the ambient atmosphere. The sudden reduction in pressure causes the blowing agent to nucleate and expand into a plurality of cells that solidify upon cooling of the polymer mass (due to the reduction in temperature), thereby trapping the blowing agent within the cells.

The foregoing, as well as other, aspects and advantages of the invention may be further understood by reference to the following examples, which are provided for illustrative purposes only and are not intended in any way to be limiting.

EXAMPLES

Resins used in the following examples are described in Table 1.

TABLE 1

| Resin | Description |
|---|---|
| PP | PRO-FAX PF814 polypropylene homopolymer from Montell Polyolefins having a melt flow rate of 3 g/10 min. and density of 0.9 g/cc. |
| mc-EAO | EXACT 4023 metallocene-catalyzed (homogeneous) ethylene/alpha-olefin (butene) copolymer from ExxonMobil Chemical having a density of 0.882 g/cc and a melt index of 35 g/10 min. |
| LDPE | Nova 219 low density polyehylene from Nova Chemical having a density of 0.919 g/cc and a melt index of 2. |

Examples 1–2

Initially, a control run (Comparative Example A) was started with 150 lbs/hr of PP resin (as described above). A twin-screw extruder having an annular sheet die was used. The temperature in the extruder was maintained at about 400° F. Butane blowing agent was added at 6.64 lbs/hr. Also, an endothermic nucleating agent comprising sodium carbonate and citric acid (CF-20 supplied by Clariant Additives), was added to nucleate fine cells. No aging modifier was required.

The die zone of the extruder was maintained around 350° F. while the die was maintained at about 260° F. For 100% PP foam, the melt temperature of the foam as it exited the die was about 335° F. The die pressure was 510 psi and the motor driving the screws drew 58.3 amperes during this control run. The resultant PP foam sheet had a thickness of 0.080 inches and a density of 3.33 pounds/ft$^3$ (sometimes abbreviated as "pcf").

After the above foam was made, the flow rate of the PP resin was decreased to 135 lbs/hr and 15 lbs/hr of mc-EAO was added (i.e., metallocene-catalyzed Exact 4023 ethylene/alpha-olefin copolymer as described in Table 1). The butane level was increased to 6.64 lbs./hr to match the control run condition. The PP/mc-EAO weight ratio was 90:10 (labeled "90% PP/10% mc-EAO" in the tables below). The addition of the mc-EAO resulted in both a lower melt temperature (331° F. vs. 335° F. for PP foam) and less motor current to drive the screws (55.4 vs. 58.3 amperes for PP foam). The die pressure was 610 psi. The resultant foam sheet, identified as Example 1 in the Tables below, had a density of 2.64 lbs/ft$^3$ and a thickness of around 0.1 inches.

The PP resin rate was further decreased to 127.5 lbs/hr and the mc-EAO rate was increased to 22.5 lbs/hr so that the blend had 85 wt. % PP and 15 wt. % mc-EAO. As a result, the melt temperature dropped to 324° F. and the motor current requirement decreased from 55.4 amperes to 51.8 amperes. The die pressure was 590 psi. The resultant foam sheet, identified as Example 2 in the Tables below, had a density of 2.64 lbs/ft$^3$ and a thickness of around 0.1 inches. The foregoing extrusion conditions are summarized in Table 2 below.

For comparative purposes, a foam sheet was made as in Example 2, except that LDPE was substituted for the mc-EAO. The resultant PP/LDPE blend was able to be made into a foam sheet, but at higher energy usage (57.1 motor amps vs. 55.4 and 51.8 with PP/mc-EAO blends) and at a higher melt temperature (326° F. vs. 331° F. and 324° F. with PP/mc-EAO blends). Thus, foams comprising blends of PP/mc-EAO are easier to process than PP/LDPE foams.

It was found that the PP/mc-EAO blend foams hold butane much better than 100% PP foam, resulting in a higher blowing agent efficiency. That is, although produced with the same type and amount of blowing agent (6.64 lbs/hr. butane), 100% PP resulted in a 0.080" thick foam sheet at 3.33 pcf density while the PP/EAO blends produced foam sheet having a thickness of 0.1" at 2.64 pcf density.

Also summarized in Table 2 are the results of lamination testing, in which each of the above three foam sheets was laminated to a foam sheet comprising LDPE (described above in Table 1). The LDPE foam sheet had a density of 2.1 pcf and was 1.95" in thickness. Lamination was carried out by feeding the foam sheets between nip rollers and injecting air heated to 900° F. through a wedge located between the sheets and adjacent the nip rollers.

TABLE 2

|  | Comparative Example A: 100% PP | Example #1: 90% PP/10% mc-EAO | Example #2: 85% PP/15% mc-EAO |
| --- | --- | --- | --- |
| MeltTemp., ° F. | 335 | 331 | 324 |
| Motor Amps | 58.3 | 55.4 | 51.8 |
| Total resin rate, lbs/hr | 150 | 150 | 150 |
| Lamination Performance | Weak bond PP and LDPE foam sheets. | Excellent lamination between the above foam and LDPE foam sheets. | Excellent lamination between the above foam and LDPE foam sheets. |
| Bond Strength with PE foam, lbf (modified ASTM F904-98), lbf/inch | 0.74 lbf | 3.77 lbf | 4.02 lbf |

As indicated, the PP/mc-EAO blend foams in accordance with the invention provide superior bonding to LDPE foam sheets as compared to 100% PP foam sheets. Generally, bond strengths of less than about 2 lbf are commercially unacceptable for watersport and other applications.

The foregoing foam sheets were tested for tensile strength (ASTM D3575-91 Suffix T), tear resistance (ASTM D3575-91 Suffix T), and % elongation (ASTM D3575-91 Suffix G), in both the machine direction (MD) and transverse direction (TD) of the foam sheets. The results are summarized in Table 3.

TABLE 3

|  | Comparative Example A: 100% PP | Example #1: 90% PP/10% mc-EAO | Example #2: 85% PP/15% mc-EAO |
| --- | --- | --- | --- |
| Foam Density, pcf | 3.33 | 2.64 | 2.64 |
| Tensile Strength, psi MD/TD | 204.4/125.6 | 123.2/88.9 | 136.3/74.9 |
| Tear Resistance, lbf/inch MD/TD | 33.9/48.01 | 22.3/33.1 | 22.8/35.4 |
| % Elongation MD/TD | 5.98/7.34 | 12.5/11.7 | 24.6/12.3 |
| % increase in elongation over PP foam (Comp. Ex. A) | n/a | 109%/59.4%* | 311%/67.6%* |

*((Elongation of blend foam-Elongation of PP foam)/Elongation of PP foam) × 100

Foams made from PP/mc-EAO blends in accordance with the present invention possess superior elongation properties relative to foams made from 100% PP. Increased tensile and tear values for 100% PP foam is due to its higher density.

Qualitatively, foams made from PP alone were found to be so stiff and brittle that they cracked easily. This was in contrast with blend foams in accordance with the present invention, which were found to possess both a high degree of stiffness and also sufficient resilience and elasticity to avoid cracking when subjected to a bending force. Although from the data in Table 3, tear resistance for PP foam appears to be higher, PP foam was found to tear more readily than PP/mc-EAO blend foams due to its poor elasticity once a crack is initiated.

Example 3

A foam composite was made having a pair of blend foams in accordance with the present invention (PP+mc-EAO) as skins bonded to a core foam of LDPE. The composite foam, which is labeled "Example 3" in Table 4 below, had the structure:

PP+mc-EAO foam/LDPE foam/PP+mc-EAO foam.

The skin foams were in accordance with Example 1 while the core LDPE foam was 1.95 inches thick with a density of 2.1 pcf. Bonding of the skin foams to the core foam was accomplished by feeding the juxtaposed skin and core foam sheets between nip rollers and injecting air, which is heated to 900° F., through wedges located between the component foam sheets. The composite structure had a total thickness of 2.10 inches and an overall density of 2.4 pcf.

Comparative Example B was a single-layer foam sheet comprising LDPE, having a thickness of 2.10 inches and a density of 2.4 pcf.

The foams of Example 3 and Comparative Example B were tested to determine their relative levels of stiffness. From each foam sheet, a sample having the dimensions 3" wide×2.1" thick×12.5" long were obtained. The samples were placed horizontally atop a pair of support stands spaced from one another by a distance of 10 inches so that each sample spanned the 10 inch separation between the two stands. Force was then applied to the top of each sample at the mid-way point between the two support stands, i.e., 5 inches from each stand. For each sample, measurements were made of the amount of force (measured in pounds-force (lbf)) required to bend the sample sufficiently to deflect the center of the sample ¼" from the horizontal starting position of the sample's center. Similar measurements were made for ½", ¾" and 1" bending deflections. The results are summarized in Table 4.

TABLE 4

| Sample | Overall Foam Density (pcf) | Foam Thickness (inches) | Bending Force, lbf @ ¼" deflection | Bending Force, lbf @ ½" deflection | Bending Force, lbf @ ¾" deflection | Bending Force, lbf @ 1" deflection |
|---|---|---|---|---|---|---|
| Comp. Ex. B | 2.4 | 2.10 | 9.90 | 15.43 | 18.77 | 21.0 |
| Ex. 3 | 2.4 | 2.06 | 14.2 | 20.5 | 22.9 | 25.0 |
| % Stiffness Increase | N/A | N/A | +43.4% higher | +32.8% higher | +22% higher | +19% higher |

As demonstrated, when relatively thin blend foams in accordance with the present invention are used as skins bonded to opposing surfaces of a foam sheet composed of LDPE to form a composite structure, a dramatic increase in stiffness is achieved in comparison to a LDPE foam sheet without such skins but with the same thickness and density as the composite structure.

While the invention has been described with reference to illustrative examples, those skilled in the art will understand that various modifications may be made to the invention as described without departing from the scope of the claims which follow.

What is claimed is:

1. A foam composite structure, comprising:
   a. a first foam sheet comprising polyethylene; and
   b. a second foam sheet comprising a blend of polypropylene and homogeneous ethylene/alpha-olefin copolymer, wherein said first and second foam sheets are bonded together at a bond strength of at least about 2 lb$_f$/inch.

2. The composite structure of claim 1, wherein said polypropylene is present in said blend at a weight percentage ranging from about 70 to about 95 and said homogeneous ethylene/alpha-olefin copolymer is present in said blend at a weight percentage ranging from about 5 to about 30, said weight percentages being based on the total weight of said blend in said second foam sheet.

3. The composite structure of claim 1, wherein said first foam sheet comprises low density polyethylene having a density ranging from about 0.5 to about 15 pounds/ft$^3$.

4. The composite structure of claim 1, further including a third foam sheet comprising polypropylene and bonded to said second foam sheet at a bond strength of at least about 2 lb$_f$/inch, wherein, said second foam sheet is positioned between said first and third foam sheets.

5. The composite structure of claim 4, wherein
   a. said first foam sheet has a thickness ranging from about 0.05 to about 2.25 inches;
   b. said second foam sheet has a thickness ranging from about 0.005 to about 0.25 inches; and
   c. said third foam sheet has a thickness ranging from about 0.05 to about 2.25 inches.

6. The composite structure of claim 1, further including a third foam sheet bonded to said first foam sheet at a bond strength of at least about 2 lb$_f$/inch, wherein
   said first foam sheet is positioned between said second and third foam sheets, and
   said third foam sheet comprises a blend of polypropylene and homogeneous ethylene/alpha-olefin copolymer.

7. The composite structure of claim 6, wherein
   a. said first foam sheet has a thickness ranging from about 0.05 to about 2.25 inches;
   b. said second foam sheet has a thickness ranging from about 0.005 to about 0.25 inch; and
   c. said third foam sheet has a thickness ranging from about 0.005 to about 0.25 inch.

8. A foam composite structure, comprising:
   a. a first foam sheet comprising polypropylene; and
   b. a second foam sheet comprising a blend of polypropylene and homogeneous ethylene/alpha-olefin copolymer, wherein said first and second foam sheets are bonded together at a bond strength of at least about 2 lb$_f$/inch.

9. The composite structure of claim 8, wherein said polypropylene is present in said blend at a weight percentage ranging from about 70 to about 95 and said homogeneous ethylene/alpha-olefin copolymer is present in said blend at a weight percentage ranging from about 5 to about 30, said weight percentages being based on the total weight of said blend in said second foam sheet.

10. The composite structure of claim 8, wherein said first foam sheet comprises polypropylene homopolymer having a density ranging from about 0.5 to about 15 pounds/ft$^3$.

11. The composite structure of claim 1, further including a third foam sheet comprising polyethylene and bonded to said second foam sheet at a bond strength of at least about 2 lb$_f$/inch, wherein, said second foam sheet is positioned between said first and third foam sheets.

12. The composite structure of claim 11, wherein
   a. said first foam sheet has a thickness ranging from about 0.05 to about 2.25 inches;
   b. said second foam sheet has a thickness ranging from about 0.005 to about 0.25 inches; and
   c. said third foam sheet has a thickness ranging from about 0.05 to about 2.25 inches.

13. The composite structure of claim 8, further including a third foam sheet bonded to said first foam sheet at a bond strength of at least about 2 lb$_f$/inch, wherein
   said first foam sheet is positioned between said second and third foam sheets, and said third foam sheet comprises a blend of polypropylene and homogeneous ethylene/alpha-olefin copolymer.

14. The composite structure of claim 13, wherein
a. said first foam sheet has a thickness ranging from about 0.05 to about 2.25 inches;
b. said second foam sheet has a thickness ranging from about 0.005 to about 0.25 inch; and
c. said third foam sheet has a thickness ranging from about 0.005 to about 0.25 inch.

15. A foam sheet comprising a blend of polypropylene and homogeneous ethylene/alpha-olefin copolymer, wherein said polypropylene is present in said blend at a weight percentage ranging from 70 to 95 and said homogeneous ethylene/alpha-olefin copolymer is present in said blend at a weight percentage ranging from 5 to 30, said weight percentages being based on the total weight of said foam sheet.

* * * * *